United States Patent [19]
Wilson et al.

[11] Patent Number: 5,528,972
[45] Date of Patent: Jun. 25, 1996

[54] BRIDGE SEAL

[75] Inventors: David Wilson, Saratoga; John E. Zweig, Poestenkill; Richard Tortorici; Anthony Scalise, both of Schenectady, all of N.Y.

[73] Assignee: The United States of America as represented by the Secretary of the Army, Washington, D.C.

[21] Appl. No.: 540,111

[22] Filed: Oct. 6, 1995

Related U.S. Application Data

[63] Continuation of Ser. No. 371,638, Jan. 12, 1995, abandoned, which is a continuation of Ser. No. 19,494, Feb. 16, 1993, abandoned.

[51] Int. Cl.⁶ ................... F41F 1/04; F16J 9/00
[52] U.S. Cl. .................. 89/7; 277/167.5; 277/144; 277/236
[58] Field of Search ............... 277/236, 167.5, 277/168, 179, 189, 207 A, 144; 89/7, 16

[56] References Cited

U.S. PATENT DOCUMENTS

| | | |
|---|---|---|
| 2,766,999 | 10/1956 | Watts et al. . |
| 3,325,176 | 6/1967 | Latham et al. ............ 277/236 |
| 3,556,568 | 1/1971 | King ........................ 277/236 |
| 4,085,653 | 4/1978 | Tassie et al. ................. 89/7 |
| 4,408,771 | 10/1983 | Shelton .................. 277/206 R |
| 4,817,962 | 4/1989 | Mott ......................... 277/236 |

FOREIGN PATENT DOCUMENTS 0034993  2/1966  Finland ........................ 89/16

*Primary Examiner*—Daniel G. DePumpo
*Attorney, Agent, or Firm*—Saul Elbaum; Edward Goldberg; Michael C. Sachs

[57] ABSTRACT

A bridge seal for a Regenerative Liquid Propulsion Gun System is compressively preloaded into interfacing gun tube cylinder and chamber cylinder seal seats providing an interference fit capable of withstanding corrosive high temperature gases and high frequency pressure impulse fluctuations.

5 Claims, 1 Drawing Sheet

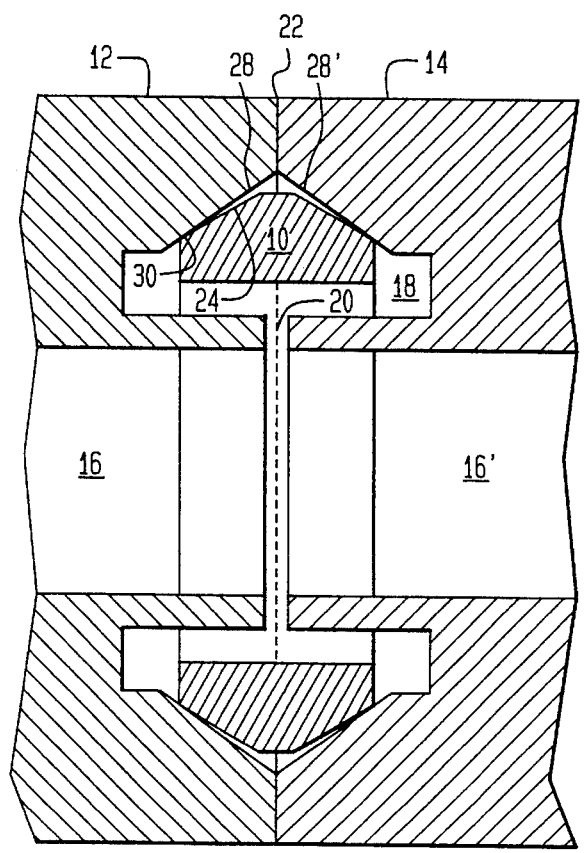
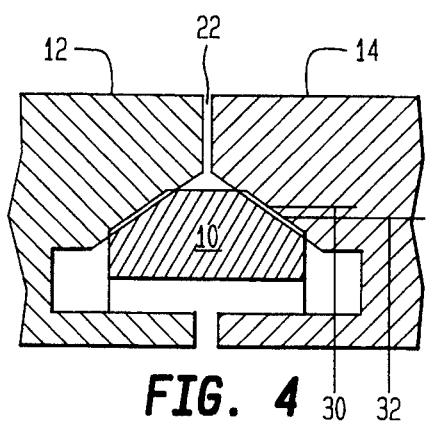
FIG. 1
FIG. 4
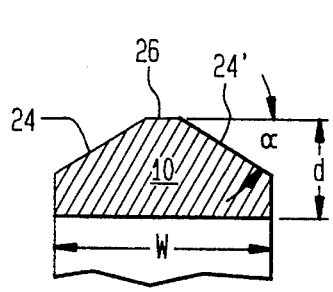
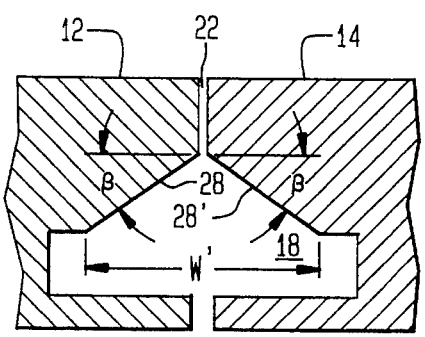
FIG. 2
FIG. 3

5,528,972

BRIDGE SEAL

GOVERNMENTAL INTEREST

The invention described herein may be manufactured, used and licensed by or for the U.S. Government.

This application is a continuation of application Ser. No. 08/371,638, filed Jan. 12, 1995 now abandoned, which itself is a continuation of application Ser. No. 08/019,494 filed Feb. 16, 1993 now abandoned.

BACKGROUND OF THE INVENTION

The development of a 155 mm Regenerative Liquid Propellant Gun (RLPG) created seal problems between mating cylinders that previously did not exist. The 155 mm RLPG cannon system creates pressures that vary from 0–56000 psi with a total operation pressure impulse of approximately 25 msec. This pressure impulse oscillates at frequencies between 5–55 kHz. The combustion of the liquid propellant used in this RLPG system produces a high temperature, high pressure gaseous nitric acid. In order to overcome these extreme environmental conditions the RLPG seal has to be capable of responding to very quick pressure rise times as well as being environmentally inert. The new seal also had to be capable of withstanding the vibratory action associated with the high frequency pressure impulse fluctuations contained within the cylinders during their operation.

The problem of sealing the interface between two mating cylinders was observed in the early test firing of the RLPG system. In the initial testing a M551 152 mm Sheridan gun seal was used. After approximately 60 firings at low pressures (0–30000 psi), the prior art seal was found to be missing after a general inspection of the gun. Sealing a joint that is not readily accessible or serviceable has been a problem throughout the history of large caliber weapon system design. The RLPG design necessitates the use of an unaccessible joint between a 52 caliber 155 mm gun tube weighing approximately 8000 lbs and a large chamber/combustor cylinder weighing approximately 7000 lbs. The prior art Sheridan gun seal used a thin flexible metal ring which under pressure created a metal-to-metal contact seal. This seal failed because the mechanics of the tube to chamber interaction along with the acidic high temperature high pressure environment was beyond the seals design limitations. These prior art seals were designed for a limited number of low pressure firings where the seal was readily accessible for replacement.

SUMMARY OF THE INVENTION

The present invention relates to a bridge seal for a Regenerative Liquid Propulsion Gun System wherein the gun tube cylinder and chamber/combustor mating cylinders are subjected to both high and low pressures as well as corrosive gases at high temperatures.

An object of the present invention is to provide for a bridge seal for a RLPG system which is capable of withstanding the vibratory action associated with high frequency pressure impulse fluctuations contained within the mating tube and chamber cylinders.

Another object of the present invention is to provide for a bridge seal for a RLPG system wherein the sealing joint between the tube and chamber cylinders is not readily accessible for servicing.

Another object of the present invention is to provide for a bridge seal for a RLPG system which is capable of surviving pressure fluctuations from 5–55 kHz which cause pressure pulses to vary from 28 kpsi to 84 kpsi.

A further object of the present invention is to provide a bridge seal for a RLPG system which is resistant to temperature as high as 2400 K, chemically resistant to gaseous nitric acid, and functional at sealing the large cylindrical gun tube to the chamber cylinder.

For a better understanding of the present invention, together with other and further objects thereof, reference is made to the following descriptions taken in connection with the accompanying drawing.

BRIEF DESCRIPTION OF THE DRAWINGS

FIG. 1 is a partial cutaway longitudinal diametral cross-sectional view of a gun tube cylinder and a chamber combustion cylinder having seal areas in axial alignment with each other and in contact with a bridge seal.

FIG. 2 is a partial diametral cross-sectional view of the bridge seal.

FIG. 3 is a partial diametral cross-sectional view of the gun tube and chamber cylinder seal seats.

FIG. 4 is a partial diametral cross-sectional view of the bridge seal assembly in interference fit and under compressive preload stress.

Throughout the following description like reference numerals are used to denote like parts of the drawings.

DETAILED DESCRIPTION OF THE PREFERRED EMBODIMENTS

Referring now to FIG. 1 seal 10 is operatively positioned between a mating gun tube cylinder and a chamber cylinder. The bores 12 and 14 16 and 16' of cylinders 12 and 14 respectively share a common inside dimension with a low or high pressure gas/fluid generated by a RLPG system. The bores 16 and 16' pneumatically communicate with the seal cavity 18 via cylinder passageway 20. Function of seal 10 is to prevent the gas/fluid generated in bores 16 and 16' from passing through the gap 22 to the outside of cylinders 12 and 14. Referring now to FIG. 2 the seal is comprised of an annular metal ring 10 having two chamfered flat surfaces 24 and 24' chambers 24 and 24' make an an angle α with respect to a horizontal line on its outer surfaces. Seal ring 10 has a flat surface 26 on its outside diameter, a width w. and a depth d. Referring now to FIG. 3 the gun tube 12 and chamber 14 cylinder seal seats 28, 28' respectively make an angle β with respect to the horizontal. FIG. 1 shows that the seal ring angle α is slightly smaller than the angle β of cylinder seal seat 28 so as to provide a mismatch between the mating surfaces 24 and 28. This mismatch provides for higher contact stress at the outer edge 30 of the seal 10. Referring now to FIG. 4 the mean angle diameter 31, defined as the diametral distance at a point midway on chamfer surface 24 and 24' to a point 180° on said surfaces, of seal ring 10 is larger than the mating cylinder seat mean angle diameter 32. Cylinder seal mean angle diameter 32 is defined as the diametral distance taken at a point midway on the chamfer seal seat 28 and 28' to a point 180° on said surfaces. This condition provides an interference fit between the mating seal 10 and the cylinder seat 28, 28' such that seal 10 is placed in compression and has what is termed as a compressive preload stress.

In operation when the mating seal 10 and seal seats 28, 28' are pressed together on assembly, there exists a contact pressure between the mating parts which forms a seal as depicted in FIG. 2, the depth d. of seal 10 and width of flat 26 can be adjusted for any given material to create the desired preload stress. The angle α can also be adjusted to accommodate mismatch between the adjoining cylinders 12 and 14 as well as to direct the desired contact stresses to their optimum locations. The width w. of seal 10 must be less than the width' of the adjoining seats 28, 28' so as to allow complete contact of seal surfaces 24, 24' to the adjoining seal seats surface 28 and 28' respectively. This is necessary to prevent galling the outer edge of seal 10 as it works against the seats 28, 28' during operation. Since the seal 10 is preloaded between the adjoining containment gun tube cylinder 12 and the chamber cylinder 14 and there exists a gap 22 between these cylinders, the seal 10 must restrict the passage of gas/fluid between cylinders 12 and 14. As the pressure of the gas/fluid contained in cylinders 12 and 14 increases the inner diameter of cylinders 12 and 14 will grow along with the gap 22. The seal is designed in such a fashion as not to be restrictive to these movements and flex with the adjoining cylinders 12 and 14. When using a seal design such that like materials are used for both the seal and adjoining cylinders, a dissimilar material is needed at the seal to cylinder interfaces to prevent the seal from galling. Silver plating on these interfacing surfaces has proved to work very well.

While a specific embodiment of the invention has been shown and described in detail to illustrate the application of the principles of the invention, it will be understood that the invention may be embodied otherwise without departing from such principles.

What is claimed is:

1. In combination a bridge seal for a regenerative liquid propellant gun system which comprises:

a gun tube cylinder having an axial bore therein;

a gun tube seal cavity disposed in an open end of said gun tube bore;

a gun tube seal seat operatively disposed in said seal cavity making an angle β with respect to a horizontal line parallel with said gun tube bore, and having a gun tube seal seat mean angle diameter;

a combustion chamber having an axial chamber bore therein, said chamber bore in axial alignment with said gun tube bore;

a combustion chamber seal cavity disposed in an open end of said combustion chamber bore disposed adjacent to and in alignment with said gun tube bore;

a combustion chamber seal seat operatively disposed in said combustion chamber seal cavity making an angle β with respect to a horizontal line parallel with said combustion chamber bore, and having a combustion chamber seal seat mean angle diameter;

bridge seal means for interfacing and mating with said gun tube seal seat and said combustion chamber seal seat under compressive preload stress condition, which includes:

an annular metal seal ring having two chamfered flat seal surfaces making an angle α with respect to said horizontal line, said angle α being equal to or smaller than said angle β;

a flat surface on said seal ring outside diameter connecting said two chamfered flat seal surfaces at their outer most edges, including:

said seal ring having a mean angle diameter greater than said gun tube seal seat mean angle diameter and said combustion chamber mean angle diameter, thereby providing an interference fit between said seal means and said gun tube and combustion chamber seal seats.

2. A bridge seal as recited in claim 1 wherein said seal ring chamfered seal surfaces are silver plated.

3. A bridge seal as recited in claim 2 wherein said annular seal ring has a diametral cross section having a depth d and a width w, said seal ring width is shorter or width than the width w' of said gun tube seal seat and combustion chamber seal seat making said bridge seal ring chamfered seal surfaces rest within and on said gun tube seal seat and said combustion chamber seal seat.

4. A bridge seal means as recited in claim 3 for a regenerative liquid propellant gun system capable of surviving pressure fluctuations varying from 5–55 KHz causing pressure pulses to vary from 28 kpsi to 84 kpsi.

5. A bridge seal means as recited in claim 4 for withstanding the vibratory action, pressure, temperature, and chemically resistant to gaseous nitric acid generated in said gun tube seal cavity and said combustion chamber seal cavity.

* * * * *